United States Patent
Cai et al.

(10) Patent No.: US 9,794,565 B2
(45) Date of Patent: Oct. 17, 2017

(54) BIT ALLOCATION SCHEME FOR REPETITIVE STRUCTURE DISCOVERY BASED 3D MODEL COMPRESSION

(71) Applicant: THOMSON LICENSING, Issy les Moulineaux (FR)

(72) Inventors: Kangying Cai, Rennes (FR); Tao Luo, Rennes (FR); Fan Zhang, Wuhan (CN)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/914,593

(22) PCT Filed: Aug. 26, 2013

(86) PCT No.: PCT/CN2013/082299
§ 371 (c)(1),
(2) Date: Feb. 25, 2016

(87) PCT Pub. No.: WO2015/027382
PCT Pub. Date: Mar. 5, 2015

(65) Prior Publication Data
US 2016/0212426 A1 Jul. 21, 2016

(51) Int. Cl.
*G06K 9/00* (2006.01)
*H04N 19/124* (2014.01)
(Continued)

(52) U.S. Cl.
CPC .......... *H04N 19/124* (2014.11); *G06T 9/001* (2013.01); *H04N 19/147* (2014.11);
(Continued)

(58) Field of Classification Search
USPC .................. 382/251, 248, 232, 233; 341/50; 348/E5.007; 370/336, 347; 375/240.03,
(Continued)

(56) References Cited

U.S. PATENT DOCUMENTS 8,711,925 B2 * 4/2014 Tu ........................ H04N 19/176
375/240.03
2014/0300598 A1 10/2014 Ahn et al.

FOREIGN PATENT DOCUMENTS

CN 102804230 A 11/2012
EP 2489012 8/2012
(Continued)

OTHER PUBLICATIONS

Wenfei et al, PB3DMC Quality control,100 MPEG Meeting, Geneva, No. m24743, Apr. 20, 2012.
(Continued)

*Primary Examiner* — Anh H Do
(74) *Attorney, Agent, or Firm* — Brian J. Dorini; Ivonete Markman

(57) ABSTRACT

A method and an apparatus for generating or decoding a bitstream representing a 3D model are described. The method comprises the steps of: accessing a first quantization parameter indicating the quality of the reconstructed 3D model; determining a second quantization parameter used for encoding or decoding patterns associated with the 3D model as a function of the first quantization parameter; performing the encoding or decoding of a pattern in response to the second quantization parameter; determining a third and a fourth quantization parameters for the transformation information for an instance being represented as a transformation of the pattern as a function of the second quantization parameter; and performing encoding or decoding of the transformation for the instance in response to the third and fourth quantization parameter. A corresponding apparatus, a computer readable storage medium having stored thereon instructions for generating or decoding a bitstream and a computer readable storage medium having stored thereon a bitstream generated according to the method are also provided.

22 Claims, 8 Drawing Sheets

(51) Int. Cl.
H04N 19/147 (2014.01)
H04N 19/162 (2014.01)
G06T 9/00 (2006.01)
H04N 19/154 (2014.01)
H04N 19/20 (2014.01)

(52) U.S. Cl.
CPC ......... *H04N 19/154* (2014.11); *H04N 19/162* (2014.11); *H04N 19/20* (2014.11)

(58) Field of Classification Search
USPC ...................................... 375/240.05, 240.25
See application file for complete search history.

(56) References Cited

FOREIGN PATENT DOCUMENTS

| KR | 2005006322 | 1/2005 |
| WO | WO2009128660 | 10/2009 |
| WO | WO2010149492 | 12/2010 |
| WO | WO2012083502 | 6/2012 |
| WO | WO2013075339 | 5/2013 |
| WO | WO2013113170 | 8/2013 |
| WO | WO2013155859 | 10/2013 |

OTHER PUBLICATIONS

Text of ISO/IEC 14496-16/PDAM4 Pattern based 3D mesh compression, 105 MPEG Meeting, Vienna No. N13795, Aug. 6, 2013.

* cited by examiner

BIT ALLOCATION SCHEME FOR REPETITIVE STRUCTURE DISCOVERY BASED 3D MODEL COMPRESSION

This application claims the benefit, under 35 U.S.C. §365 of International Application PCT/CN2013/082299, filed Aug. 26, 2013, which was published in accordance with PCT Article 21(2) on Mar. 5, 2015 in English.

TECHNICAL FIELD

The present invention generally relates to 3D (three dimensional) model compression technology. In particular, the present invention relates to a method and apparatus for bit allocation of repetitive structure discovery based 3D model compression.

BACKGROUND

In 3D computer graphics, the 3D surface of an object can be developed by a mathematical representation, the output of which is called a 3D model. A 3D model may comprise a plurality of components. FIG. 1 is an exemplary diagram showing a 3D castle model. As shown in FIG. 1, the castle model as a whole could be referred to as the mentioned 3D model which comprises a plurality of components, such as structures of a pillar, tower, window, etc. It can be appreciated that both the 3D model and the component can be in a hierarchical structure. In that case, there are different levels of 3D model and its corresponding components.

In practical applications, such as 3D games, virtual chatting room, digital museum, and CAD, many 3D models consist of a large number of connected components. These multi-connected 3D models usually contain a non-trivial amount of repetitive structures via various transformations. In the castle model shown in FIG. 1, the structure of a pillar is reproduced multiple times on the walls of each of the four towers. The basic structure of the pillar is shown at the lower right of FIG. 1. In addition, each tower itself comprises a repetitive structure illustrated by the lower left part of FIG. 1. Depending on its position, this basic tower structure is complemented with smaller structures such as some of the windows placed on the roofs. In this sense, the tower structure is a connected component which comprises one or more repetitive structures. It can be appreciated that some of the repetitive structures can also be hierarchical.

An efficient compression method for this kind of 3D models enables to explore the repetitive structures and extract the redundancy to achieve a high compression ratio.

Pattern-based 3D Model Compression (PB3DMC) codec, which is an efficient compression algorithm for multi-connected 3D models, was proposed by taking advantage of discovering repetitive structures in input 3D models. Repetitive structures of a 3D model are discovered in various positions, orientations, and scaling factors. The 3D model is then organized into "pattern-instance" representation. A pattern is used to denote a representative geometry of a corresponding repetitive structure. Components belonging to a repetitive structure are denoted as instances of the corresponding pattern and may be represented by a pattern ID and transformation information, for example, reflection, translation, rotation and possible scaling with respect to the pattern. The instance transformation information may be organized into, for example, reflection part, translation part, rotation part, and possible scaling part. There might be some components of the 3D models that are not repetitive, which are referred to as unique components. The instances can be represented by a pattern ID and an instance transformation matrix, which may include information on reflection, scaling, rotation and translation etc. It can be appreciated that an instance component can be completely recovered from the instance transformation matrix and the corresponding pattern, which can be retrieved using the pattern ID. Thus, when compressing an instance component, it is equivalent to compress the pattern ID and the instance transformation matrix.

PB3DMC has been presented to MPEG-3DGC since the 95th MPEG meeting and received quite positive feedback. The bitstream syntax and semantics of PB3DMC has been proposed to MPEG-3DGC in the 97th, 98th and 99th MPEG meeting. From the 97th MPEG meeting to the 100th MPEG meeting, PB3DMC is part of 3DG Core Experiment (CE). Starting from the 101th MPEG meeting, PB3DMC is moving from Core Experiment (CE) to Working Draft (WD).

In 3D model compression, some components or some parts of components of a 3D model may need to be allocated with a number of bits for the mathematical representation. For example, in the codec of the repetitive structure discovery based 3D model compression, a number of bits might be need to be allocated to the reflection, scaling, rotation and translation parts of an instance component and unique components of a 3D model. An efficient bit allocation scheme is an important topic for designing a 3D model codec.

SUMMARY

In view of the above problem in the conventional technologies, a method and an apparatus for optimized bit allocation scheme of repetitive structure discovery based 3D model compression are proposed, which calculates the optimal quantization bits of pattern, instance rotation and instance translation under given the coding error.

According to one aspect of the invention, a method for generating or decoding a bitstream representing a 3D model is provided. The method comprises the steps of: accessing a first quantization parameter indicating the quality of the reconstructed 3D model; determining a second quantization parameter used for encoding or decoding patterns associated with the 3D model as a function of the first quantization parameter; performing the encoding or decoding of a pattern in response to the second quantization parameter; determining a third and a fourth quantization parameters for the transformation information for an instance being represented as a transformation of the pattern as a function of the second quantization parameter; and performing encoding or decoding of the transformation for the instance in response to the third and fourth quantization parameter.

According to one aspect of the invention, a corresponding apparatus is provided, which includes means for generating or decoding a bitstream representing a 3D model according to the above-described method.

According to one aspect of the invention, a computer readable storage medium having stored thereon instructions for generating or decoding a bitstream according to the above-described method.

According to one aspect of the invention, a computer readable storage medium having stored thereon a bitstream generated according to the above-described method.

According to one aspect of the invention, a program for a computer to perform the steps of accessing a first quantization parameter indicating the quality of the reconstructed 3D model; determining a second quantization parameter used for encoding or decoding patterns associated with the 3D model as a function of the first quantization parameter; performing the encoding or decoding of a pattern in response to the second quantization parameter; determining a third and a fourth quantization parameters for the transformation information for an instance being represented as a transformation of the pattern as a function of the second quantization parameter; and performing encoding or decoding of the transformation for the instance in response to the third and fourth quantization parameter.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings.

DETAILED DESCRIPTION

An embodiment of the present invention will now be described in detail in conjunction with the drawings. In the following description, some detailed descriptions of known functions and configurations may be omitted for conciseness.

As described above, the repetitive structures in a 3D model was explored to improve compression efficiency to improve compression efficiency of 3D model compression. For example, PCT application PCT/CN2012/070877, entitled "System and method for error controllable repetitive structure discovery based compression" by K. Cai, W. Jiang, and T. Luo commonly owned by the same applicant as the present application discloses a method and apparatus for identifying repetitive structures in 3D models to reduce redundancy among instance components, and thus to improve compression efficiency of PB3DMC. In PA120001, 14/391,563 a method and an apparatus for 3D model compression are described. Repetitive structures in the 3D model are identified to increase the compression ratio by reducing the redundancy among the instance components. The instance components can be expressed in a "pattern-instance" representation. As described above, in the "pattern-instance" representation, a pattern is used to denote a representative geometry of a corresponding repetitive structure and components belonging to a repetitive structure are denoted as instances of the corresponding pattern and may be represented by a pattern ID and transformation information with respect to the pattern. The instance transformation information may be organized into, for example, reflection part, translation part, rotation part, and possible scaling part. Some components of the 3D models might be not repetitive, which are referred to as unique components. After the instance components are expressed in a "pattern-instance" representation, a decision is made as to whether to compress the "pattern-instance" representation for the 3D model. For those instance components that are determined to be encoded in "pattern-instance" representation, a verification process is employed to examine the decoding error of the instance components. If the decoding error is below a threshold value, the instance components are compressed in the "pattern-instance" representation. Otherwise, a different encoding mode is used to compress the instance components.

Figure 1:
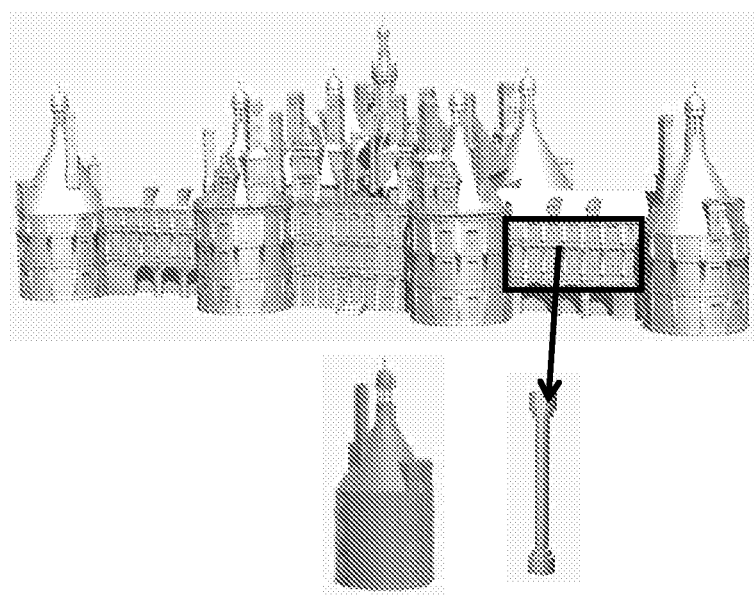
FIG. 1 is an exemplary diagram showing a 3D castle model with a plurality of connected components and repetitive structures.
Figure 2A:
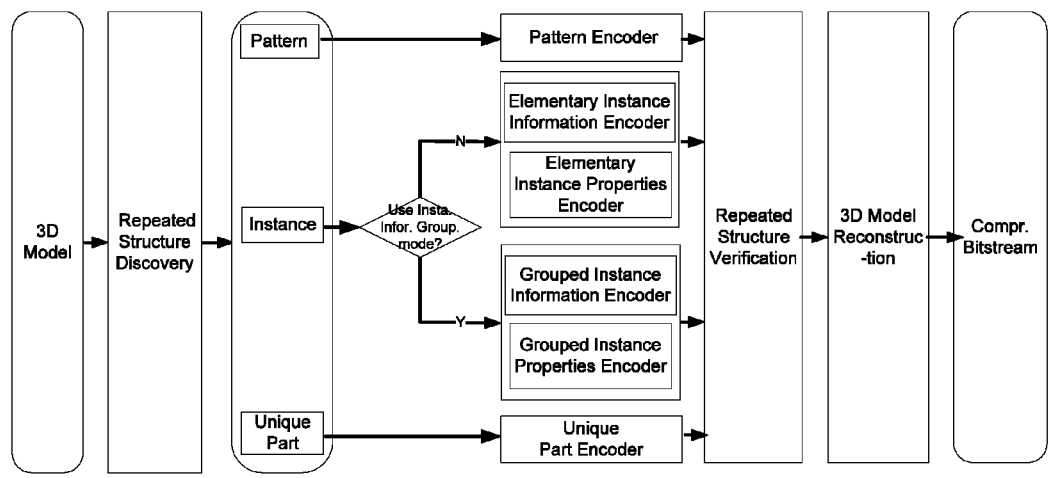
FIG. 2A is an exemplary diagram showing an exemplary PB3DMC encoder of 3D models.
Figure 2B:
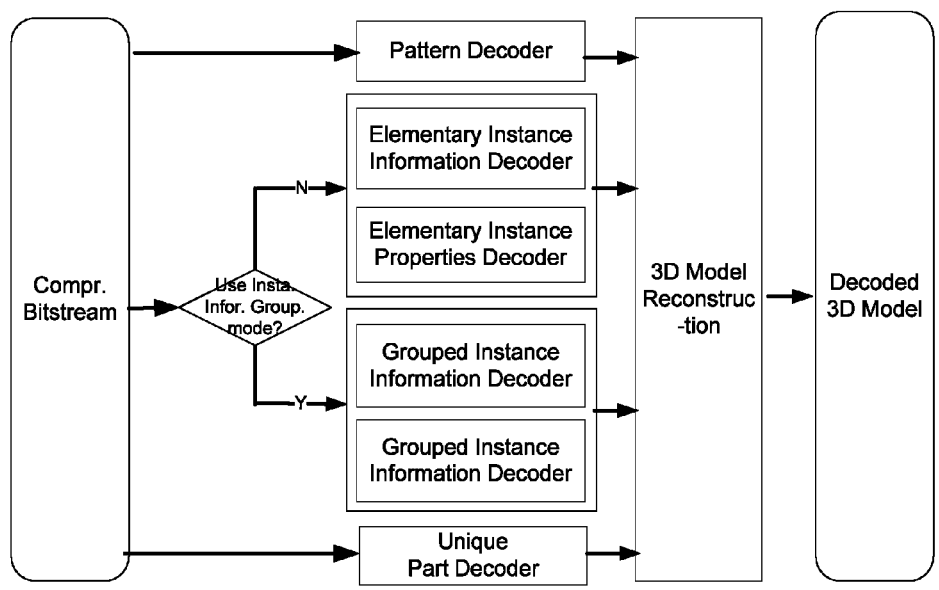
FIG. 2B is an exemplary diagram showing an exemplary PB3DMC decoder of 3D models.

FIGS. 2A and 2B respectively shows the high-level block diagram for the PB3DMC encoder and PB3DMC decoder in PA120008, 14/378,334. During encoding, a 3D model first goes through the repetitive structure discovery process, which outputs the 3D model in terms of patterns, instances and unique components. A pattern encoder is employed to compress the patterns and a unique component encoder is employed for encoding the unique components. For the instances, the instance component information is encoded based on a user-selected mode. If instance information group mode is selected, the instance information is encoded using grouped instance information encoder; otherwise, it is encoded using an elementary instance information encoder. The encoded components are further verified in the repetitive structure verification stage before being sent to the compressed bitstream. During the decoding, the patterns in the compressed bitstream of the 3D model are decoded by a pattern decoder and the unique components are decoded by a unique component decoder. The decoding of the instance information also depends on the user-selected mode. If instance information group mode is selected, the instance information is decoded using a grouped instance information decoder; otherwise, it is decoded using an elementary instance information decoder. The decoded patterns, instance information and unique components are reconstructed to generate the output decoded 3D model.

The subject matter of shown in FIGS. 2A and 2B is also disclosed in the co-pending PCT application PCT/CN2012/071348, entitled "Methods for compensating decoding error in three-dimensional models" by K. Cai, W. Jiang, and T. Luo commonly owned by the same applicant as the present application.

Bit allocation is important for the efficiency of the repetitive structure discovery based 3D model compression. Except for the lossless encoded reflection transformation, other data in the factored representation is compressed with precision loss. And the distortion of different types of data has different influence on the quality of the entire reconstructed 3D model. Therefore, the bit allocation scheme for PB3DMC needs to be carefully designed.

A commonly owned PCT application, entitled "Method and apparatus for repetitive structure discovery based 3D model compression" by K. Cai, W. Jiang, and T. Jiang (PCT/CN2012/087937) has proposed one solution of the bit allocation for PB3DMC codec. According to PA120021, 14/391,563 a 3D model can be modeled using "pattern-instance" representation, wherein an instance component may be represented as transformation (for example, rotation, translation, and scaling) of a pattern. To minimize the reconstruction, the quantization parameters for the rotation part and translation part for transformation of an instance can be determined based on the quantization parameter used for encoding a corresponding pattern. Specifically, the quantization parameter for the rotation part may depend on the size of the instance, and the quantization parameter for the translation part may depend on the scale of translation.

The limitation of the above bit allocation scheme described in PA120021, 14/391,563 includes:

(1) Only the coding error can be optimized when designing the bit allocation scheme and the size of the compressed 3D model has not been optimized;

(2) The influence of the number of the vertices of patterns and the number of instances on the bit allocation has not been taken into account.

An embodiment of the present invention provides a method and apparatus for bit allocation of repetitive structure discovery based 3D model compression, wherein the optimal quantization bits of pattern, instance rotation and instance translation of bitstream representation of a 3D model are calculated under a given coding error.

According to the embodiment of the invention, both the size of the compressed 3D model and the coding error were taken into account when designing the bit allocation scheme. The target is to minimize the size of the compressed 3D model while satisfying the given quality requirement, which can be written as below.

$$\min(\text{ComprModelSize}), \text{ while } \|v-v_d\| \le \text{MaxErr} \qquad \text{Equ.1}$$

where MaxErr is the allowed maximum coding error. Get the optimized numbers of quantization bits for pattern, instance translation and rotation by representing ComprModelSize and $\|v-v_d\|$ by those numbers of quantization bits.

Firstly, the calculation of the size of a compressed 3D model will be discussed below. In this respect, it is assumed that all the instance translations use the same number of quantization bits and all instance orientations use the same number of quantization bits. Then the size of compressed 3D model can be calculated by $$\text{ComprModelSize} = c_P * (3Q_P * \#\text{PatternVer} + \#\text{PatternTri}) + 3Q_T * \#\text{Insta} + 3Q_R * \#\text{Insta} \qquad \text{Equ.2}$$

where $c_P$ is a predefined constant which relates to the regularity of the patterns, #PatternVer and #PatternTri are the number of vertices and triangles of all patterns, #Insta is the number of instances, $Q_P$, $Q_T$ and $Q_R$ are the number of quantization bits for patterns, instance translations and instance orientations.

Secondly, the calculation of the coding error will be discussed.

As a scaling factor is compressed by lossless floating point codec, the scaling transformation is not involved in the following discussion. Based on the discovered "pattern-instance" representation, any vertex v of the original 3D model can be represented by $$v = R*p + T \qquad \text{Equ.3}$$

where p is v's corresponding vertex of the corresponding pattern, R and T are the rotation matrix and translation vector between p and v.

The decoded position of v is calculated by $$v_d = R_d * p_d + T_d \qquad \text{Equ. 4}$$

where $p_d$ is the decoded position of p, $R_d$ and $T_d$ are the decoded rotation matrix and decoded translation vector.

Then $$v - v_d = (R*p + T) - (R_d*p_d + T_d) = (R*p - R_d*p_d) + (T - T_d) = (R*p - R_d*p_d) + \Delta T \qquad \text{Equ.5}$$

The coding error of v is calculated as below:

$$\|v - v_d\| = \|(R*p - R_d*p_d) + \Delta T\| \le \|R*p - R_d*p_d\| + \|\Delta T\| \le \qquad \text{Equ. 6}$$
$$\|R*p - R_d*p + R_d*p - R_d*p_d\| + \|\Delta T\| \le$$
$$\|R*p - R_d*p\| + \|R_d*p - R_d*p_d\| + \|\Delta T\| \le$$
$$\|(R - R_d)*p\| + \|p - p_d\| + \|\Delta T\| =$$
$$\|(R - R_d)*p\| + \|\Delta p\| + \|\Delta T\|$$

where $\Delta p$ and $\Delta T$ are the error of pattern vertices and instance translations caused by quantization.

The rotation matrix is represented by Euler angles $(\alpha,\beta,\gamma)$ $(-\pi/2 \le \alpha \le \pi/2, -\pi \le \beta, \gamma \le \pi)$ and will be quantized using the same quantization bit. Then $$\|(R-R_d)*p\| \le c_\theta \Delta\theta * r \qquad \text{Equ.7}$$

$$r = \max(\|PO\|)$$

where $\Delta\theta$ is the quantization error of $\alpha$, $\beta$ and $\gamma$, $c_\theta$ is some predefined constant, P is any vertex of the current pattern, O is the rotation center of the current pattern.

Then $$\|v - v_d\| \le c_\theta \Delta\theta \|p\| + \|\Delta p\| + \|\Delta T\| \le \qquad \text{Equ. 8}$$
$$c_\theta \frac{2\pi}{2^{Q_R+1}} r + \frac{\text{PatternScale}}{2^{Q_P+1}} + \frac{\text{TranslScale}}{2^{Q_T+1}}$$

where PatternScale and TranslScale are the scale of the bounding-box of all patterns and instance translations respectively.

Next, it will be described how to rewrite the target function according to the above findings.

According to Equ.2 and Equ.8, Equ.1 can be written as follows.

$$\min(3c_P * \#\text{PatternVer} * Q_P + 3 * \#\text{Insta} * Q_T + 3 * \#\text{Insta} * Q_R), \qquad \text{Equ. 9}$$

while $$c_\theta \frac{2\pi}{2^{Q_R+1}} r + \frac{\text{PatternScale}}{2^{Q_P+1}} + \frac{\text{TranslScale}}{2^{Q_T+1}} \le \text{MaxErr}$$

Note that the constant $c_P * \#\text{PatternTri}$ has been omitted.

Let $a_R = 2\pi c_\theta r$, $a_P = \text{PatternScale}$, $a_T = \text{TranslScale}$, and $b_P = 3c_P * \#\text{PatternVer}$, $b_R = 3 * \#\text{Insta}$, $b_T = 3 * \#\text{Insta}$, Equ.9 can be written as $$\begin{cases} \min(b_P * Q_P + b_T * Q_T + b_R * Q_R) \\ \frac{a_R}{2^{Q_R}} + \frac{a_P}{2^{Q_P}} + \frac{a_T}{2^{Q_T}} \le \text{MaxErr}/2 \end{cases} \qquad \text{Equ. 10}$$

Let $x_R=2^{-Q_R}$, $x_P=2^{-Q_P}$, $x_T=2^{-Q_T}$, Equ.10 can be rewritten as $$\begin{cases} \max(\log_2 x_P^{b_P} x_T^{b_T} x_R^{b_R}) \\ a_P x_P + a_T x_T + a_R x_R \leq MaxErr/2 \end{cases} \Rightarrow \qquad \text{Equ. 11}$$

$$\begin{cases} \max(x_P^{b_P} x_T^{b_T} x_R^{b_R}) \\ a_P x_P + a_T x_T + a_R x_R \leq MaxErr/2 \end{cases}$$

$$\min(-x_P^{b_P} x_T^{b_T} x_R^{b_R} - \lambda(MaxErr/2 - a_P x_P - a_T x_T - a_R x_R)) \qquad \text{Equ. 12}$$

Let $f(x_P, x_T, x_R) = -x_P^{b_P} x_T^{b_T} x_R^{b_R} - \lambda(MaxErr/2 - a_P x_P - a_T x_T - a_R x_R)$, Minimize $f(x_P, x_T, x_R)$ equals $$\frac{df(x_P, x_T, x_R)}{dx_i} = -\frac{b_i}{x_i} * x_P^{b_P} x_T^{b_T} x_R^{b_R} + \lambda a_i = 0, i \in \{P, T, R\} \qquad \text{Equ. 13}$$

$$\lambda \frac{a_i}{b_i} x_i = x_P^{b_P} x_T^{b_T} x_R^{b_R}, i \in \{P, T, R\} \qquad \text{Equ. 14}$$

$$\frac{a_P}{b_P} x_P = \frac{a_T}{b_T} x_T = \frac{a_R}{b_R} x_R \Rightarrow \begin{cases} x_T = \frac{a_P}{a_T} \frac{b_T}{b_P} x_P \\ x_R = \frac{a_P}{a_R} \frac{b_R}{b_P} x_P \end{cases} \qquad \text{Equ. 15}$$

Then we can get the relationship between $x_T$, $x_R$ and $x_P$ as follows $$\begin{cases} Q_T = Q_P + \log_2\left(\frac{a_T}{a_P} \frac{b_P}{b_T}\right) = Q_P + \log_2\left(\frac{TranslScale}{PatternScale} * \frac{c_P * \#PatternVer}{\#Insta}\right) \\ Q_R = Q_P + \log_2\left(\frac{a_R}{a_P} \frac{b_P}{b_R}\right) = Q_P + \log_2\left(\frac{2\pi c_\theta r}{PatternScale} * \frac{c_P * \#PatternVer}{\#Insta}\right) \end{cases} \qquad \text{Equ. 16}$$

The above findings can be used to design an optimized bit allocation scheme for repetitive structure discovery based 3D model compression.

Figure 3:
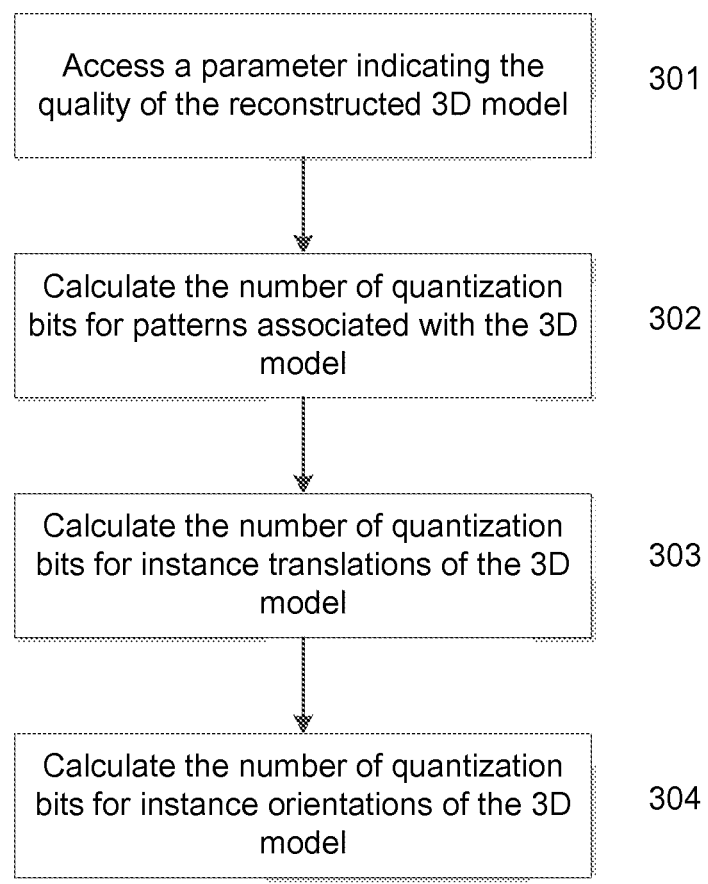
FIG. 3 is a flow chart showing a method for bit allocation for PB3DMC according to an embodiment of the invention.

FIG. 3 is a flow chart showing a method for bit allocation of PB3DMC according to an embodiment of the invention.

At Step 301, it accesses a parameter indicating the quality of the reconstructed 3D model.

In this embodiment, the above parameter is indicated as QB, which is a user specified constant to indicate the requirement of the reconstructed 3D model.

At Step 302, it calculates $Q_P$, the number of quantization bits for patterns associated with the 3D model, as a function of QB.

For example, it can calculate a threshold for discovering the repetition among the components of a 3D model.

MaxErr, the allowed maximum coding error, can be used as the threshold for repetition discovery.

$$MaxErr = c_{QB} * ModleScale \qquad \text{Equ.17}$$

where $c_{QB}$ is from an user input lookup table, such as the Quality Parameter ($Q_P$) table below which is described in PA120001, 14/391,563 using QB as the lookup index, and ModleScale is the scale of the whole input 3D model.

| $Q_P$ | 0 | 1 | 2 | 3 | 4 | 5 | 6 | 7 |
|---|---|---|---|---|---|---|---|---|
| Distance threshold | FLT_MAX | FLT_MAX | FLT_MAX | FLT_MAX | 0.7 | 0.7 | 0.2 | 0.2 |
| $Q_P$ | 8 | 9 | 10 | 11 | 12 | 13 | 14 | 15 |
| Distance threshold | 0.05 | 0.05 | 0.013 | 0.013 | 0.001 | 0.001 | 0.001 | 0.001 |
| $Q_P$ | 16 | 17 | 18 | 19 | 20 | 21 | 22 | 23 |
| Distance threshold | 0.001 | 0.001 | 0.001 | 0.001 | 0.001 | 0.001 | 0.001 | 0.001 |
| $Q_P$ | 24 | 25 | 26 | 27 | 28 | 29 | 30 | 31 |
| Distance threshold | 0.001 | 0.001 | 0.001 | 0.001 | 0.001 | 0.001 | 0.001 | 0.001 | where FLT_MAX is the maximum float point number value.

$$Q_P = \left\lceil QB + \log_2\left(\frac{PatternScale}{ModelScale}\right) \right\rceil \qquad \text{Equ. 18}$$

In order to optimize the RD (rate-distortion) performance of PB3DMC codec, The x, y and z dimension of the patterns are made to have the same quantization error. Then the three dimensions of the boundingbox of all patterns will use different numbers of quantization bits.

Suppose x is the dimension of the boundingbox of all patterns with the maximum scale.

$$\begin{cases} Q_{P_X} = Q_P \\ Q_{P_Y} = \left\lceil Q_P + \log_2\left(\frac{PatternScale\_Y}{PatternScale\_X}\right) \right\rceil \\ Q_{P_Z} = \left\lceil Q_P + \log_2\left(\frac{PatternScale\_Z}{PatternScale\_X}\right) \right\rceil \end{cases} \qquad \text{Equ. 19}$$

At Step 303, it calculates $Q_T$, the number of quantization bits for instance translations of the 3D model as a function of $Q_P$.

$$Q_T = \left\lceil Q_P + \log_2\left(\frac{TranslScale}{PatternScale} * \frac{c_P * \#PatternVer}{\#Insta}\right) \right\rceil \qquad \text{Equ. 20}$$

For the same reason, the three dimensions of the boundingbox of instance translations will use different numbers of quantization bits. Suppose x is the dimension of the boundingbox of all instance translations with the maximum scale.

$$\begin{cases} Q_{T_X} = Q_T \\ Q_{T_Y} = \left\lceil Q_T + \log_2\left(\frac{\text{TranslScale\_Y}}{\text{TranslScale\_X}}\right) \right\rceil \\ Q_{T_Z} = \left\lceil Q_T + \log_2\left(\frac{\text{TranslScale\_Z}}{\text{TranslScale\_X}}\right) \right\rceil \end{cases} \quad \text{Equ. 21}$$

At Step 304, it calculates $Q_R$, the number of quantization bits for instance orientations of the 3D model as a function of $Q_P$.

In Equ.16, it shows that $O_R$ is related to r. Thus instances with different scale should use different number of quantization bits to optimize the RD performance of PB3DMC codec. The number of quantization bits of the rotation of the $i^{th}$ instance could be calculated by $$Q_{R_i} = \left\lceil Q_P + \log_2\left(\frac{2\pi c_\theta r_i}{\text{PatternScale}} * \frac{c_P * \#PatternVer}{\#Insta}\right) \right\rceil \quad \text{Equ. 22}$$

$$\begin{cases} Q_{R_\alpha} = Q_R/2 \\ Q_{R_\beta} = Q_R \\ Q_{R_\gamma} = Q_R \end{cases} \quad \text{Equ. 23}$$

Figure 4:
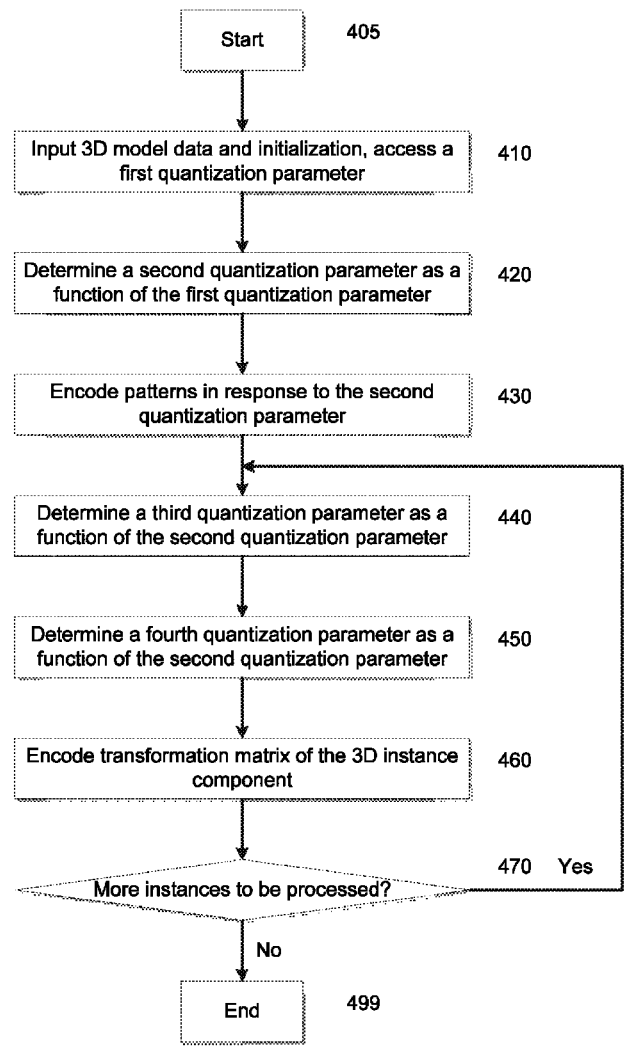
FIG. 4 is a flow chart showing a method for encoding patterns and instances of a 3D model according to an embodiment of the invention.

FIG. 4 is a flow chart showing a method for encoding patterns and instances of a 3D model.

Method 400 starts at step 405. At step 410, a 3D model data is input and initialization is performed. Additional data, such as quality parameter, quantization parameters for encoding patterns, may also be input or inferred from the input. In this step, a first quantization parameter indicating the quality of the reconstructed 3D model, for example the above-described QB, may be accessed. At step 420, a second quantization parameter, the number of quantization bits for patterns associated with the 3D model, may be determined as a function of the first quantization parameter, for example, using Equ. 19. At step 430, patterns are encoded to form reconstructed patterns in response to the second quantization parameter. At step 440, a third quantization parameter, the number of quantization bits for instance translations of the 3D model, may be determined as a function of the second quantization parameter, for example, using Equ. 21. At step 450, a fourth quantization parameter, the number of quantization bits for instance orientations of the 3D model, may be determined as a function of the second quantization parameter, for example, using Equ. 23. The transformation matrix for the instance is then encoded at step 460 in response to the third and fourth quantization parameters. It checks whether more instances need to be processed at step 470. If more instances are to be processed, the control is returned to step 440. Otherwise, the control is passed to the end step 499.

Figure 5:
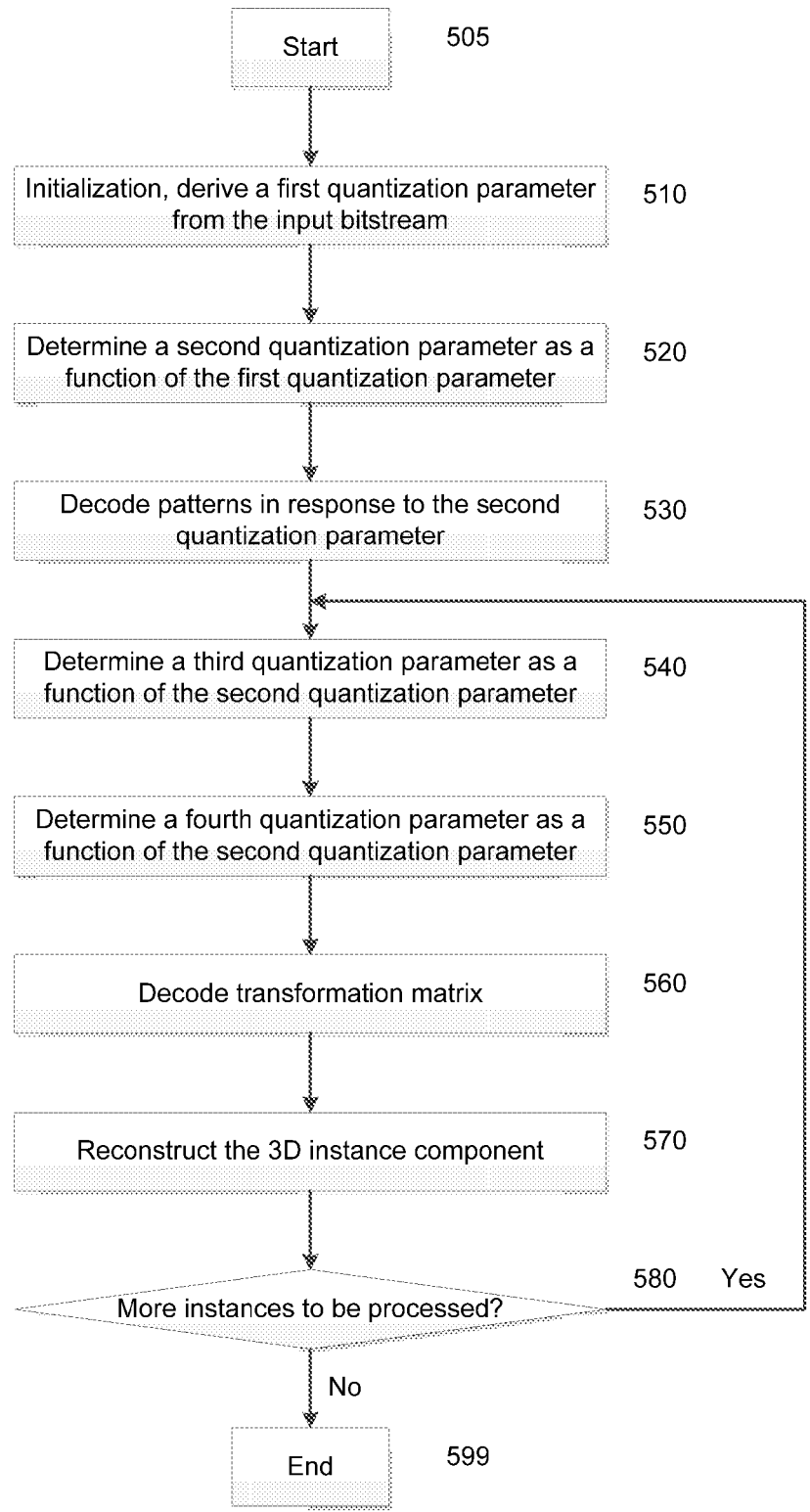
FIG. 5 is a flow chart showing a method for decoding patterns and instance of a 3D model according to an embodiment of the invention.

FIG. 5 is a flow chart showing a method 500 for decoding patterns and instance of a 3D model. The input of method 500 may include a bitstream, for example, a bitstream generated using method 400. Method 500 starts at step 505. At step 510, initialization is performed, for example, the quantization parameter used for encoding patterns is derived from the input bitstream. In this step, a first quantization parameter indicating the quality of the reconstructed 3D model, for example the above-described QB, may be accessed. At step 520, a second quantization parameter, the number of quantization bits for patterns associated with the 3D model, may be determined as a function of the first quantization parameter, for example, using Equ. 19. At step 530, patterns are decoded in response to the second quantization parameter. At step 540, a third quantization parameter, the number of quantization bits for instance translations of the 3D model, may be determined as a function of the second quantization parameter, for example, using Equ. 21. At step 550, a fourth quantization parameter, the number of quantization bits for instance orientations of the 3D model, may be determined as a function of the second quantization parameter, for example, using Equ. 23. The transformation matrix is decoded at step 560. The instance is then reconstructed at step 570, for example, using a corresponding reconstructed pattern and decoded transformation matrix. It checks at step 580 whether more instances need to be processed. If yes, the control is returned to step 540. Otherwise, the control is passed to the end step 599.

Figure 6:
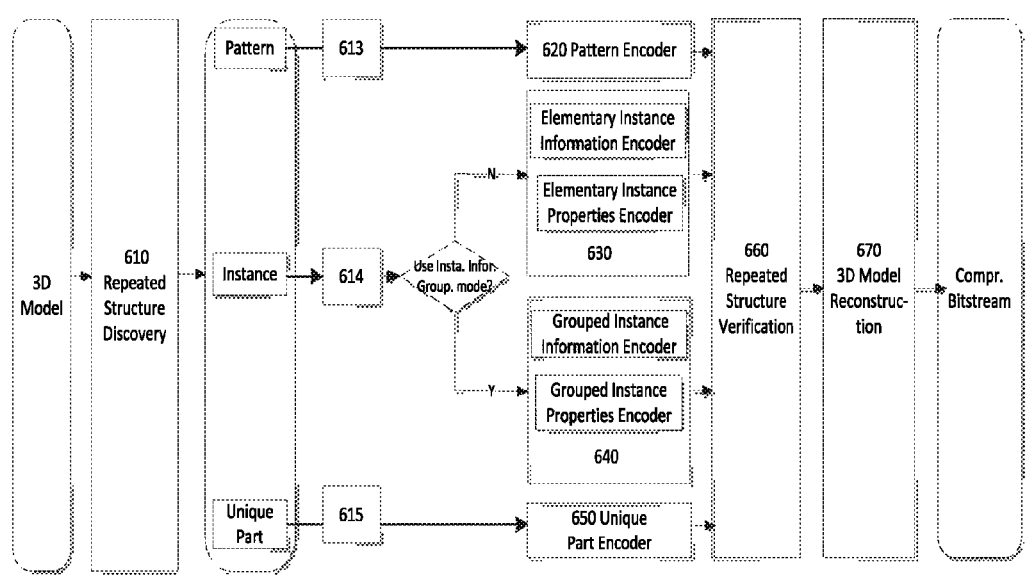
FIG. 6 is a block diagram of a 3D model encoder according to an embodiment of the invention.

FIG. 6 is a block diagram of an exemplary 3D model encoder 600. As shown in FIG. 6, the input of apparatus 600 may include a 3D model, quality parameter for encoding the 3D model and other metadata. The 3D model first goes through the repetitive structure discovery module 610, which outputs the 3D model in terms of patterns, instances and unique components. A first calculation unit 613 calculates the number of quantization bits for patterns associated with the 3D model as a function of QB. This quantization parameter is inputted to a pattern encoder 620 which is employed to compress the patterns.

The 3D model encoder 600 further comprises a second calculation unit 614 for calculating quantization parameters of instance translations and rotations as a function of the above quantization parameter for the pattern. As described above, the quantization parameters by second calculation unit 614 could be the number of quantization bits for instance translations of the 3D model and the number of quantization bits for instance orientations of the 3D model. These quantization parameters are inputted to the instance encoder to compress the instances.

The 3D model encoder 600 further comprises a third calculation unit 615 for calculating the quantization parameters of the unique part. This quantization parameter is inputted to a unique component encoder 650 which is employed to encode the unique components.

For the instance encoding, the instance component information is encoded based on a user-selected mode. If instance information group mode is selected, the instance information is encoded using grouped instance information encoder 640; otherwise, it is encoded using an elementary instance information encoder 630. The encoded components are further verified in the repetitive structure verifier 660. If an encoded component does not meet its quality requirement, it will be encoded using unique component encoder 650. Bitstreams for patterns, instances, and unique components are assembled at bitstream assembler 670.

Figure 7:
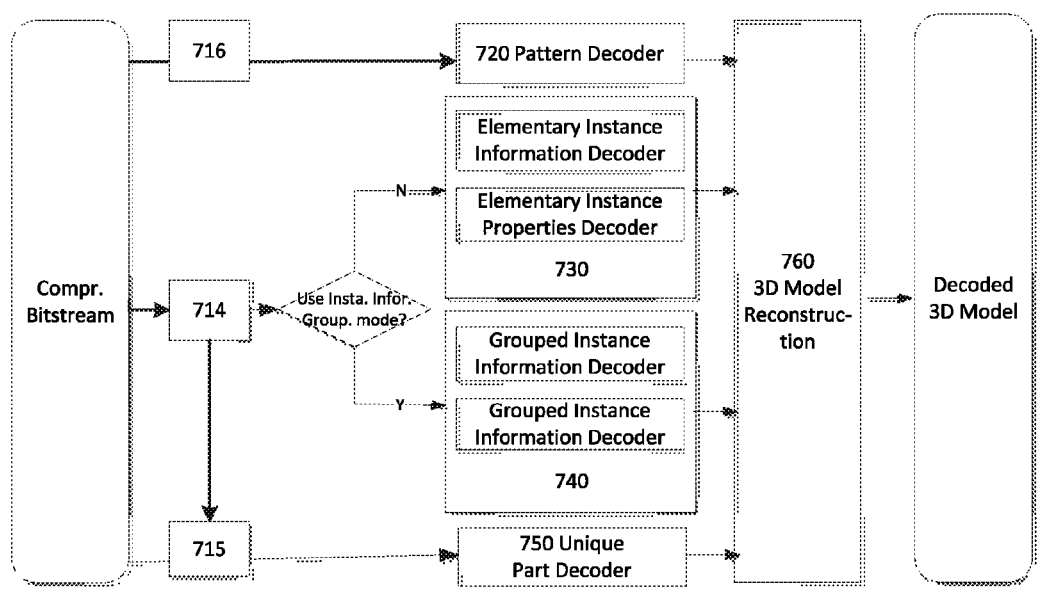
FIG. 7 is a block diagram of a 3D model decoder according to an embodiment of the invention.

FIG. 7 is a block diagram of a 3D model decoder 700. The input of apparatus 700 may include a bitstream of a 3D model, for example, a bitstream generated by encoder 600.

The 3D model decoder 700 comprises a pattern information unit 716 for obtaining the quantization parameter of patterns at the decoder side. One example for the pattern information unit 716 is to get the quantization parameter of patterns from the compressed bitstream. Another example is to calculate the quantization parameter of patterns using the quantization parameter from the compressed bitstream. The information related to patterns obtained above is decoded by pattern decoder 720.

The 3D model decoder 700 further comprises an instance transformation unit 714 for obtaining quantization parameters of instance translations and rotations as a function of the above quantization parameter for the pattern. It could be appreciated that quantization parameters of instance translations and rotations could be obtained from the compressed bitstream or calculated using the quantization parameter from the compressed bitstream.

The 3D model decoder 700 comprises a unique information unit 716 for obtaining information related to unique components, which is then decoded by unique component decoder 750.

Similarly, the decoding of the instance information also depends on the user-selected mode. If instance information group mode is selected, the instance information is decoded using a grouped instance information decoder 740; otherwise, it is decoded using an elementary instance information decoder 730. The decoded patterns, instance information and unique components are reconstructed to generate an output 3D model at model reconstruction module 760.

Figure 8:
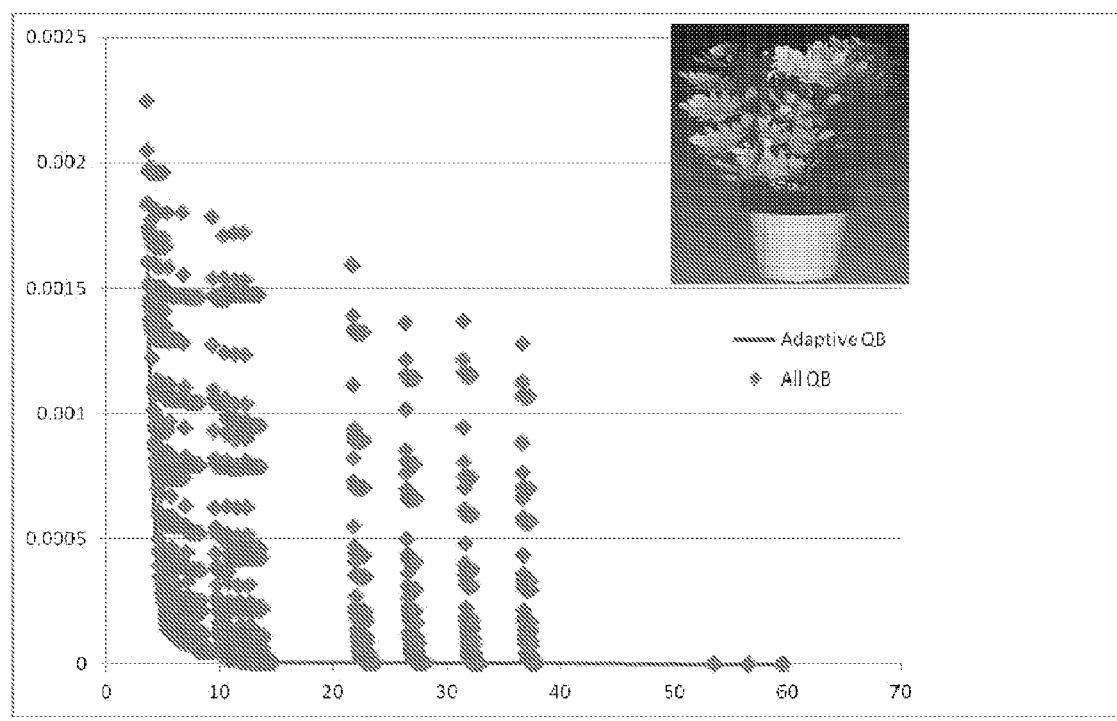
FIG. 8 is an exemplary diagram showing the RD (rate-distortion) performance of the optimized bit allocation scheme according to the embodiment of the invention.

FIG. 8 is an exemplary diagram showing the RD performance of the optimized bit allocation scheme according to the embodiment of the invention. As shown in FIG. 8, the optimized bit allocation scheme according to the embodiment of the invention achieves the best RD performance of the possible combinations of numbers of quantization bits of pattern, instance translation and instance rotations.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for decoding a bitstream representing a 3D model, comprising the steps of:
   determining, by a decoder, a second quantization parameter ($Q_P$) used for decoding patterns associated with the 3D model as a function of a first quantization parameter (QB) indicating the quality of a reconstructed 3D model, wherein the first quantization parameter is a user specified constant to indicate the requirement of the reconstructed 3D model;
   performing, by a decoder, a decoding of a pattern in response to the second quantization parameter ($Q_P$);
   determining, by a decoder, a third and a fourth quantization parameters ($Q_T$, $Q_R$) for the transformation information for an instance being represented as a transformation of the pattern as a function of the second quantization parameter ($Q_P$); and
   performing a decoding of the transformation for the instance in response to the third and fourth quantization parameters ($Q_T$, $Q_R$).

2. Method according to claim 1, wherein the second quantization parameter is the number of quantization bits for patterns associated with the 3D model, the third quantization parameter is the number of quantization bits for instance translations of the 3D model, and the fourth quantization parameter is the number of quantization bits for instance orientations of the 3D model.

3. Method according to claim 1, further comprising determining, by a decoder, the second quantization parameter as a function of the first quantization parameter, the scale of all patterns, and the scale of the 3D model.

4. Method according to claim 1, further comprising determining, by a decoder, the third quantization parameter for a translation part of the transformation information for the instance as a function of the second quantization parameter, the scale of patterns, the scale of the translation part of all instances, and the number of vertices of all patterns and the number of instances.

5. Method according to claim 1, further comprising determining, by a decoder, the fourth quantization parameter for a rotation part of the transformation information for the instance as a function of the second quantization parameter, the scale of the instance, the scale of patterns, the number of vertices of the patterns and the number of instances.

6. Computer program comprising program code instructions executable by a processor for implementing the steps of a method according to claim 1.

7. Computer program product which is stored on a non-transitory computer readable medium and comprises program code instructions executable by a processor for implementing the steps of a method according to claim 1.

8. An apparatus comprising a processor configured to:
   determine a second quantization parameter ($Q_P$) used for decoding patterns associated with the 3D model as a function of a first quantization parameter (QB) indicating the quality of a reconstructed 3D model, wherein the first quantization parameter is a user specified constant to indicate the requirement of the reconstructed 3D model;
   perform a decoding of a pattern in response to the second quantization parameter ($Q_P$);
   determine a third and a fourth quantization parameters ($Q_T$, $Q_R$) for the transformation information for an instance being represented as a transformation of the pattern as a function of the second quantization parameter ($Q_P$); and
   performing encoding or decoding of the transformation for the instance in response to the third and fourth quantization parameters ($Q_T$, $Q_R$).

9. The apparatus according to claim 8, wherein the second quantization parameter is the number of quantization bits for patterns associated with the 3D model, the third quantization parameter is the number of quantization bits for instance translations of the 3D model, and the fourth quantization parameter is the number of quantization bits for instance orientations of the 3D model.

10. The apparatus according to claim 8, wherein the processor is further configured to determine the second quantization parameter as a function of the first quantization parameter, the scale of all patterns, and the scale of the 3D model.

11. The apparatus according to claim 8, wherein the processor is further configured to determine the third quantization parameter for a translation part of the transformation information for the instance as a function of the second quantization parameter, the scale of patterns, the scale of the translation part of all instances, and the number of vertices of all patterns and the number of instances.

12. The apparatus according to claim 8, wherein the processor is further configured to determine the fourth quantization parameter for a rotation part of the transformation information for the instance as a function of the second quantization parameter, the scale of the instance, the scale of patterns, the number of vertices of the patterns and the number of instances.

13. A method for generating a bitstream representing a 3D model, comprising the steps of:
   determining, by an encoder, a second quantization parameter ($Q_P$) used for encoding patterns associated with the 3D model as a function of a first quantization parameter (QB) indicating the quality of a reconstructed 3D model, wherein the first quantization parameter is a user specified constant to indicate the requirement of the reconstructed 3D model;

performing, by an encoder, an encoding of a pattern in response to the second quantization parameter ($Q_P$);

determining, by an encoder, a third and a fourth quantization parameters ($Q_T$, $Q_R$) for the transformation information for an instance being represented as a transformation of the pattern as a function of the second quantization parameter ($Q_P$); and performing an encoding of the transformation for the instance in response to the third and fourth quantization parameters ($Q_T$, $Q_R$).

14. Method according to claim 13, wherein the second quantization parameter is the number of quantization bits for patterns associated with the 3D model, the third quantization parameter is the number of quantization bits for instance translations of the 3D model, and the fourth quantization parameter is the number of quantization bits for instance orientations of the 3D model.

15. Method according to claim 13, further comprising determining, by an encoder, the second quantization parameter as a function of the first quantization parameter, the scale of all patterns, and the scale of the 3D model.

16. Method according to claim 13, further comprising determining, by an encoder, the third quantization parameter for a translation part of the transformation information for the instance as a function of the second quantization parameter, the scale of patterns, the scale of the translation part of all instances, and the number of vertices of all patterns and the number of instances.

17. Method according to claim 13, further comprising determining, by an encoder, the fourth quantization parameter for a rotation part of the transformation information for the instance as a function of the second quantization parameter, the scale of the instance, the scale of patterns, the number of vertices of the patterns and the number of instances.

18. An apparatus comprising a processor configured to:

determine a second quantization parameter ($Q_P$) used for encoding patterns associated with the 3D model as a function of a first quantization parameter (QB) indicating the quality of a reconstructed 3D model, wherein the first quantization parameter is a user specified constant to indicate the requirement of the reconstructed 3D model;

perform an encoding of a pattern in response to the second quantization parameter ($Q_P$);

determine a third and a fourth quantization parameters ($Q_T$, $Q_R$) for the transformation information for an instance being represented as a transformation of the pattern as a function of the second quantization parameter ($Q_P$); and performing an encoding of the transformation for the instance in response to the third and fourth quantization parameters ($Q_T$, $Q_R$).

19. The apparatus according to claim 18, wherein the second quantization parameter is the number of quantization bits for patterns associated with the 3D model, the third quantization parameter is the number of quantization bits for instance translations of the 3D model, and the fourth quantization parameter is the number of quantization bits for instance orientations of the 3D model.

20. The apparatus according to claim 18, wherein the processor is further configured to determine the second quantization parameter as a function of the first quantization parameter, the scale of all patterns, and the scale of the 3D model.

21. The apparatus according to claim 18, wherein the processor is further configured to determine the third quantization parameter for a translation part of the transformation information for the instance as a function of the second quantization parameter, the scale of patterns, the scale of the translation part of all instances, and the number of vertices of all patterns and the number of instances.

22. The apparatus according to claim 18, wherein the processor is further configured to determine the fourth quantization parameter for a rotation part of the transformation information for the instance as a function of the second quantization parameter, the scale of the instance, the scale of patterns, the number of vertices of the patterns and the number of instances.

* * * * *